Oct. 2, 1923.

S. F. BAUWENS

WIRE JOINING TOOL

Filed June 24, 1920

INVENTOR
Seraphine F. Bauwens
BY Edward Dunne Jr.
ATTORNEY

Oct. 2, 1923.

S. F. BAUWENS
WIRE JOINING TOOL
Filed June 24, 1920

INVENTOR
Séraphine F. Bauwens
BY
Edward F. Dunne Jr
ATTORNEY

Oct. 2, 1923. 1,469,711

S. F. BAUWENS

WIRE JOINING TOOL

Filed June 24, 1920 3 Sheets-Sheet 3

INVENTOR
Seraphine F. Bauwens
BY
Edward Downey Jr.
ATTORNEY

Patented Oct. 2, 1923.

1,469,711

UNITED STATES PATENT OFFICE.

SERAPHINE F. BAUWENS, OF CHICAGO, ILLINOIS, ASSIGNOR TO WIREBOUNDS PATENTS COMPANY, A CORPORATION OF MAINE.

WIRE-JOINING TOOL.

Application filed June 24, 1920. Serial No. 391,404.

*To all whom it may concern:*

Be it known that SERAPHINE F. BAUWENS, a citizen of the United States, and a resident of Chicago, county of Cook, and State of Illinois, has invented an Improvement in Wire-Joining Tools, of which the following description, in connection with the accompanying drawings, is a specification, like characters on the drawings representing like parts.

This invention relates to wire working and to tools, devices, or machines for use in joining wires, wire bindings, or wire ties, on or about boxes, box parts, bales, bundles, packages, or the like.

Among other objects the invention is intended to provide a tool or device adapted to readily receive ends of wires to be joined and produce a strong efficient joinder therebetween. Another object is to sever the ends of the wires in such a manner as to leave them free of objectionable sharp edges or points. Another object is to provide a tool adapted to join the ends of wires about a box or package by intertwisting said wire ends in such a manner as to produce a strong, even twist and tension the wire about the box or package. A still further object is to provide a tool or device of the class described which may be used to perform operations upon wires of different size or gauge.

The invention will be clearly understood from the following description with reference to one illustrative tool containing an embodiment of the invention shown in the accompanying drawings.

A simple form of hand tool is selected for illustration, it being understood, however, that the invention is not limited to the specific illustrative form nor to a hand tool.

Referring to the drawings.

Figure 4:
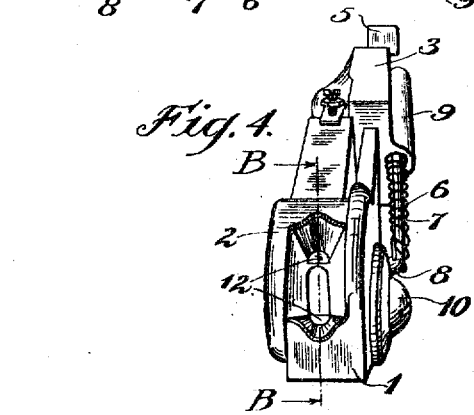
Fig. 4 is a perspective view of the tool proper, looking from the left in Fig. 1, eliminating the brace for turning the same.
Figure 5:
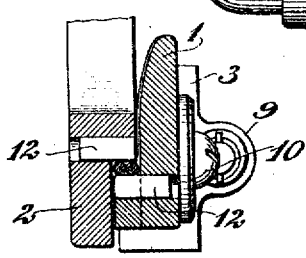
Fig. 5 is an enlarged cross section of the twister jaws in closed position, taken on the line A—A of Fig. 2.
Figure 6:
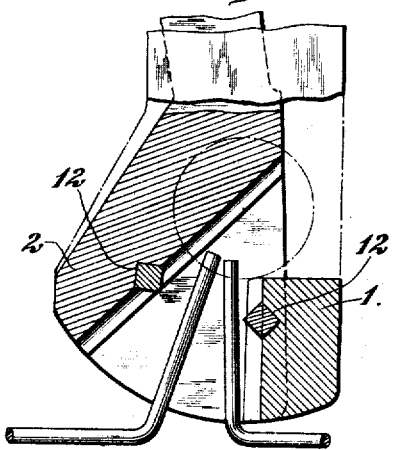

Figs. 6, 7, 8, and 9 are longitudinal sectional views of the twister jaws taken on line B—B of Fig. 4 and showing the position of the parts during different stages of the operation of the tool.

Figure 10:
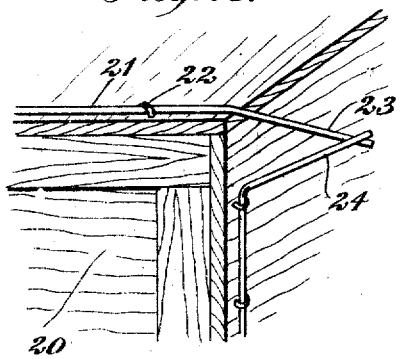

Fig. 10 is a perspective view of a corner portion of an ordinary wirebound box, the wires or wire ends on the lid and front side of which are to be tensionally joined to complete the continuity of the wire binding and hold the lid firmly closed.

Figure 11:
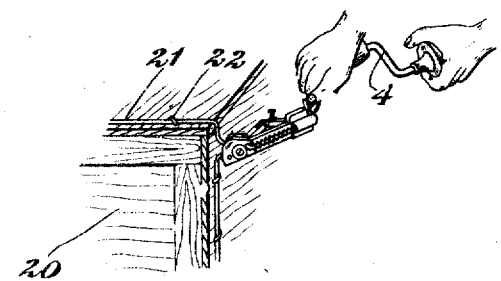
Figure 12:
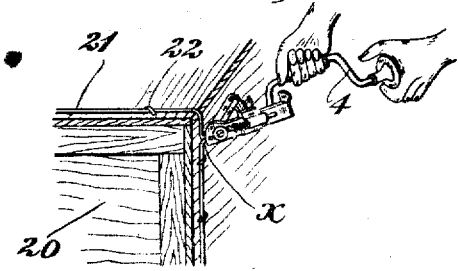

Figs. 11 and 12 are perspective views illustrating the use of the illustrative tool in joining the said wire ends.

Figure 13:
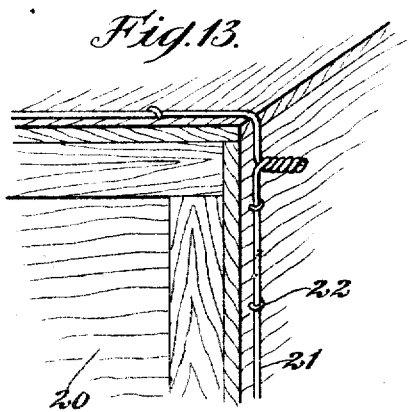

Fig. 13 is a perspective view of the box corner after the production of the joint made by intertwisting the wire ends.

Figure 14:
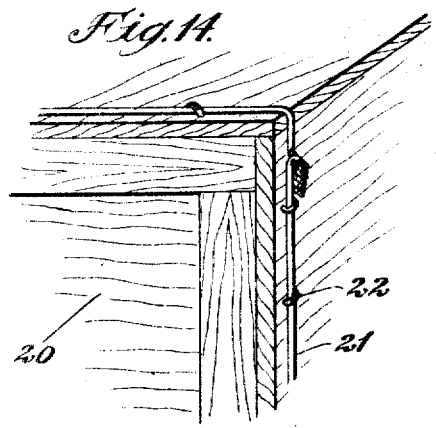

Fig. 14 is a similar view, after the twisted wires have been hammered down against the side of the box.

Figure 1:
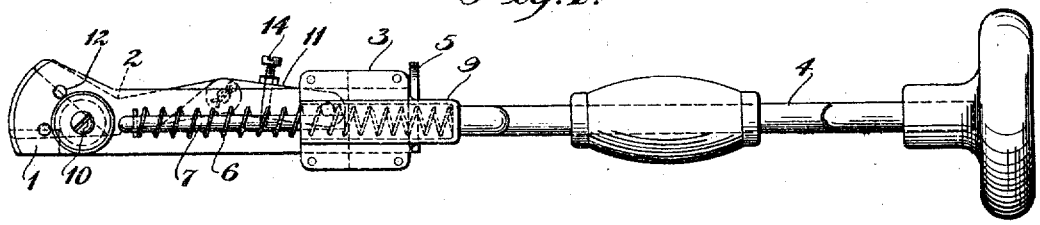
Fig. 1 is a side elevation of the illustrative tool with the jaws open to receive the wire ends to be operated upon.
Figure 2:
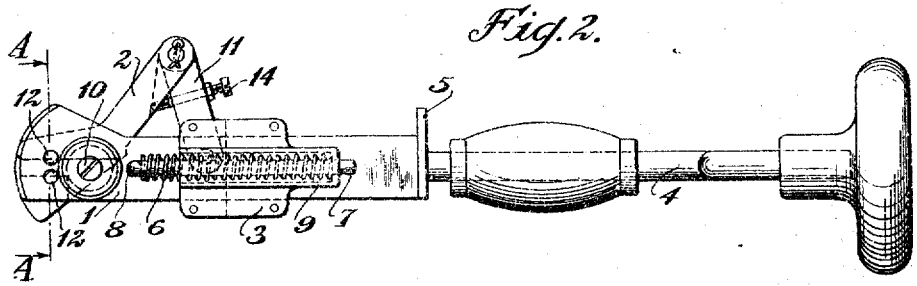
Fig. 2 is a side elevation showing the jaws closed and in position for a twisting operation.
Figure 3:
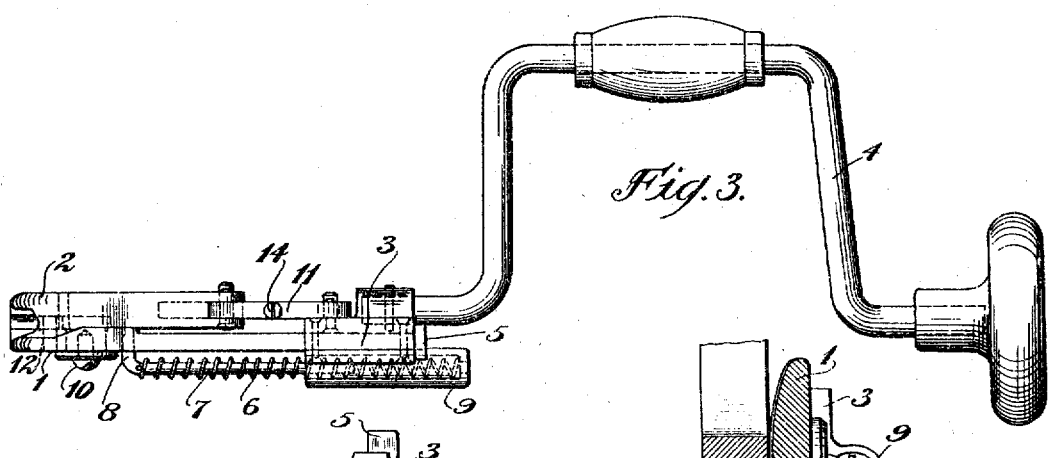
Fig. 3 is a top plan view showing the tool turned on its long axis at right angles to the position shown in Fig. 1.

The illustrative tool comprises a pair of relatively movable jaws 1 and 2 carried by a body portion 3, to which a brace 4 may be attached for convenience in turning the tool. Jaw 1 is slidably mounted in a slot formed in the body portion 3 and is provided at its inner extremity with a plate or upstanding portion 5 adapted to engage body portion 3 to limit the outward movement of jaw 1, thus determining the extended position thereof. Plate 5 is normally yieldingly held against body portion 3 by a compression spring 6 carried by spring rod 7 attached to jaw 1 at 8 and reciprocable through a cylindrical portion 9 formed as a part of body portion 3. Thus, jaw 1 is normally maintained in an extended position. Jaw 2 is pivotally connected to jaw 1 by a bolt 10 and has a toggle connection with body portion 3 through toggle arm 11 pivotally connected, respectively, to the inner extremity of jaw 2 and to the body portion 3. Thus, it will be seen that movement of jaw 1 through body portion 3 will cause jaw 2 to pivot about its point of attachment to jaw 1 and move relatively to jaw 1, all as shown in Figs. 1 and 2. Jaws 1 and 2 are so constructed and arranged that when said jaws are in the extended position shown in Fig. 1, the noses or outer extremities of the jaws are expanded relative to each other and when said jaws are retracted the noses or the outer extremities thereof are contracted, as shown in Fig. 2.

As best shown in Fig. 4, the outer extremities of jaws 1 and 2 are so formed as to provide, when expanded, an enclosed opening into which the wire ends to be twisted may be easily inserted, regardless of kinks or bends in said wires, and are also so formed as to provide, when contracted, a barrel or bore incasing the wire ends therein and holding them against buckling during a twisting operation.

For gripping the wires to be joined, jaws 1 and 2 are each provided with a transverse gripping member 12 which, in this instance, consists of a small square pin or bar; said pins being inserted and held in openings located a suitable distance from the nose extremity of each jaw and so inserted that when the jaws are contracted in the manner shown in Figs. 6 to 9, the corner edges of pins 12 will approach one another and close upon the wires, holding them side by side in such a manner as to prevent them from wrapping one about the other when the tool is turned.

The gripping members 12 are so proportioned and arranged with reference to the resistance and strain to be developed by the twist, as to perform a wire-severing action upon the completion of the twist.

Figure 7:
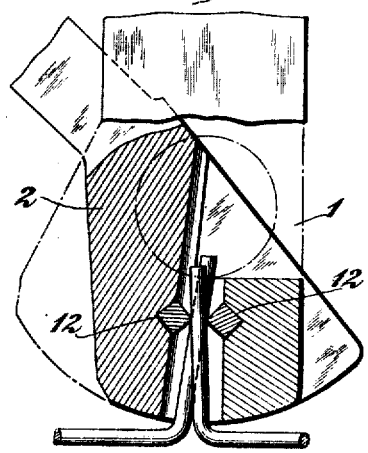
Figure 8:
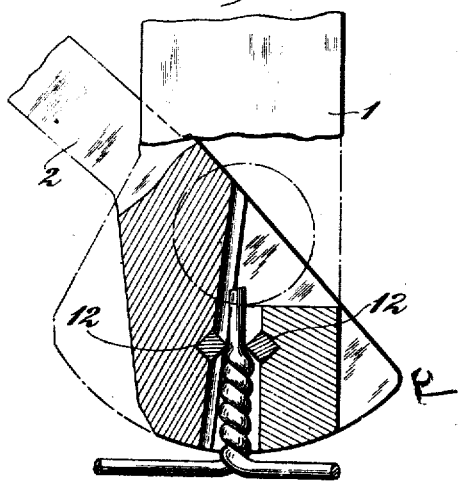
Figure 9:
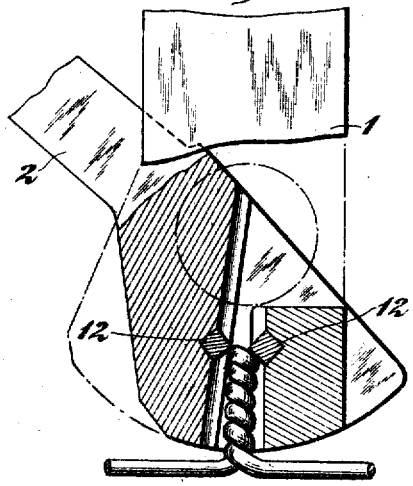

In the use of the tool for joining, for instance, the ends of a wire binding or tie about a box, the end portions of the wire are brought together, as shown in Fig. 10, and the opening formed by jaws 1 and 2 is slipped over the wire ends as shown in Fig. 11. The jaws and wires are then in the position shown in Fig. 6. The nose of the tool is then pressed against the box side, as shown in Fig. 12, thus closing the jaws about the wires and locating the gripping members 12 in reference to the side of the box. When jaws 1 and 2 are thus contracted, gripping the wires between pins 12 and forming a bore or channel incasing the wire, as shown in Fig. 7, the tool is revolved a number of times by turning the handle of the brace to intertwist the wires between the box and the gripping pins; and when the twist is completed, that is, when the tightening of its convolutions develops a certain degree of resistance against further twisting action, as shown in Fig. 8, the continued rotation of the tool will cause the pins to disrupt or distort the metal of the wires and sever the terminal of the twist, as shown in Fig. 9, thus automatically disengaging the tool from the wire.

The severing of the wires at the point of gripping may result from a combined squeezing, tearing, wrenching, shearing, and swaging, or, according to particular designs of different specific tools embodying features of this invention, it may depend mainly upon one or more of such factors. Apparently, the butt end of the twist functions as an anvil against which the wires are swaged by the pins. The tightness of the convolutions of the twist and the time of the severing operation may depend upon the degree of pressure exerted upon the wire by the gripping members or upon the form of the gripping members, or both; that is, if the tool is lightly pressed against the side of the box, the wires will be lightly gripped by the gripping members and the severing operation will not occur as soon as it would if the wires were gripped by the pins with more pressure thereagainst, and it has been found in practice that if the gripping members are so formed as to grip the wires with blunt or rounded surfaces, the twist will be tighter and the severing operation will occur at a later period in the operation of the tool. Thus, it will be seen that the tool may be controlled to produce the desired tightness of twist before a severing operation by the degree of pressure applied to it and that by reason of the relative movability of the jaws, the tool is adapted to operate upon wires of any size or gauge.

For convenience in operation and to insure the production of uniform twists, regardless of the experience or skill of the operator, means for controlling the extent of contraction of the jaws and the degree of pressure exerted on the wires by the gripping members is provided. Such means may consist of the screw 14 passing through toggle arm 11 which may be adjusted by turning to contact with the under side of jaw 2, as shown in Fig. 2, and thereby limit further contraction of the jaws. Thus, regardless of excessive pressure applied to the tool by the operator, the pressure of the gripping members on the wires will be limited and constant.

In the illustrative type of tool, the gripping pins 12 are located a distance from the nose of the jaws, according to the desired length of twist to be produced, so that the jaws, when closed, performing the function of a gauge, position the pins with reference to the box side and hold them in such position during the twisting operation; consequently, the twist pulls the wire oppositely from the box and the gripping pins, resulting in a beneficial tensioning of the box binding and causing a gradually increasing strain on the wire at the gripping point, which further contributes to insurance of the severing action in advance of a rupture or breakage in or beyond the twist.

Usually, the drawing of the wire for the convolutions of the twist will be from around the box and between the box and gripping pins, thus tensioning the wire about the box; though, after the wire becomes sufficiently tight on the box or in cases in which the wire is initially tensioned about the box before twisting, the operator may lighten the pressure of the gripping pins on the wire, thus permitting the wire to be drawn between the gripping pins. However, with the illustrative type of tool, longitudinal slippage of the wire between the gripping pins will not occur, at least to any considerable extent, so long as the wire can be further tightened about the box.

A further function of the illustrative tool is performed by the jaws which, when closed upon the wires, form a barrel or bore which encloses and holds the wires at the box so that they cannot wind one about the other; the gripping members and the mouth of said bore functioning as a plurality of wire-engaging means spaced apart a distance approximately equal to the desired twist; with the wires so held, the formation of the twist, instead of proceeding from the gripping pins toward the box or from the box toward the gripping pins, takes place approximately uniformly along the entire length of wire between the box and the gripping pins and in each turn of the tool the wires tension uniformly, resulting in each convolution of the twist being uniformly tensioned and the avoidance of extra tension where the twist joins the body wires.

In adjoining binding wires around boxes by ordinary twisting methods, the twist forms progressively from the tool toward the box or vice versa, each turn of the twist drawing in wire for that particular turn and getting an independent tension. If the twist proceeds toward the box, the tightening of the wires draws in the tool, losing a certain tensioning advantage and the convolutions of the twist increase in tension toward the box, the joint being, therefore, weakest at the box end. If, on the other hand, the twist proceeds from the box, the tensioning of the binding is practically established by the first turn, losing the advantage of continued tensioning, and the strain is still greatest at the box.

It will be noted that, by reason of the relative movability of the jaws and gripping members, the tool is adapted for operation upon wires of different gauge and that the wires may be readily inserted in the tool regardless of kinks and bends therein and that, when the jaws have been contracted and close upon the wires, they form a bore or barrel, preferably slightly larger than the completed coil or twist, thus preventing any tendency of buckling of the twist after its completion and insuring the severing of the terminal by the continued rotation of the tool.

For use in joining binding wires of wirebound boxes, which are stapled around the box in a comparatively taut state, it has been found desirable to locate the gripping pins about one-half inch from the nose of the jaws, this distance having been selected partly with reference to the taut state of the wires as applied to the box, and also with a view to obtaining a short but amply efficient twist.

The manner of handling the tool is illustrated in Figs. 10 to 14. In these figures, 20 designates a wirebound box having a wire binding 21 fastened thereabout by staples 22, the portions of said wire binding on adjacent separably related box sides or sections, e. g., the lid and front, having free end portions 23 and 24 which are to be tensionally connected to complete the continuity of the binding and tightly close the box. As indicated in Fig. 10, the wire ends 23 and 24 are brought together so that the tool may be slipped thereover. As shown in Figs. 11 and 12, the tool is slipped over the wire ends and pressed against the box side, thus closing the jaws 1 and 2 and bringing the wire ends 23 and 24 together adjacent the box side, as shown at "*x*", and causing the pins to grip the wires. The tool is then revolved by turning the brace to intertwist the wires, and when the twist is completed the wire is automatically wrung off at the tip of the twist, as indicated in Fig. 13, leaving a blunt tipped twist which may be hammered down against the box side, as shown in Fig. 14.

Obviously, the present invention is not limited to the specific embodiment illustrated and described but features of the invention are susceptible of embodiment in various devices and may be advantageously used in various combinations and sub-combinations.

What is claimed is:

1. A tool for joining package wires by intertwisting comprising relatively movable members to receive and hold the wires side by side, and means to position said members a distance from the package during the operation of the tool whereby rotation of said members will cause the wires to be intertwisted and severed.

2. A tool for joining package wires by intertwisting comprising relatively movable gripping members to receive and grip the wires, and means to position the gripping members a distance from the package during the operation of the tool whereby rotation of the gripping members will intertwist the wires between the package and the point of gripping and sever the wires at the gripping point.

3. A tool for joining package wires by intertwisting comprising relatively movable members normally expanded to receive the wires to be joined and adapted to close upon and hold the wires side by side, and means to position said members a distance from the package during the operation of the tool whereby rotation of said members will cause the wires to be intertwisted and severed.

4. A tool for joining package wires by intertwisting comprising relatively movable gripping members normally expanded to receive the wires to be joined and adapted by pressure of the tool against the package to close upon and grip the wires, and means to position the gripping members a distance from the package during the operation of the tool whereby rotation of the gripping members will cause the wires to be intertwisted and severed.

5. A tool for joining package wires by intertwisting comprising relatively movable gripping members to receive and grip the wires, and package engaging means to position the gripping members a distance from the package during the operation of the tool whereby rotation of the gripping members will cause the wires to be intertwisted and severed.

6. A tool for joining package wires by intertwisting comprising relatively movable gripping members to receive and grip the wires, and means to position the gripping members a distance from the package during the operation of the tool whereby rotation of the gripping members will intertwist the wires and tension the same about the package.

7. A tool for joining package wires by intertwisting comprising relatively movable gripping members to receive and grip the wires, and means to position the gripping members a distance from the package during the operation of the tool whereby rotation of the gripping members will produce a twist of predetermined length.

8. A tool for joining package wires by intertwisting comprising relatively movable gripping members to receive and grip the wires, and means to position the gripping members a distance from the package during the operation of the tool whereby rotation of the gripping members will produce a twist of predetermined length and sever the tip of the twist in such a manner as to leave the same free of objectionable sharp edges or burrs.

9. A tool for joining package wires by intertwisting comprising relatively movable gripping members to receive and grip the wires a distance from the package, and means to engage the wires and hold them side by side adjacent the package whereby rotation of the gripping members will cause the wires to intertwist evenly with each convolution of the twist uniformly tensioned.

10. A tool for joining package wires by intertwisting comprising relatively movable gripping members to receive and grip the wires a distance from the package and by rotation to intertwist them, and means to engage the wires and hold them side by side adjacent the package, said wire-gripping members and said wire-engaging means being spaced apart a distance approximately equal to the length of a desired twist.

11. A tool for joining package wires by intertwisting comprising relatively movable gripping members to receive and grip the wires a distance from the package and by rotation to intertwist them, and relatively movable wire-engaging means adapted to engage the wires and hold them side by side adjacent the package.

12. A tool for joining package wires by intertwisting comprising relatively movable gripping members normally expanded to receive the wires and adapted to close upon and grip the wires a distance from the package, and relatively movable wire-engaging means normally expanded to receive the wires and adapted to close upon and hold the wires side by side adjacent the package, said gripping and engaging means cooperating upon rotation of the gripping means to control the formation of the twist.

13. A tool for joining package wires by intertwisting comprising relatively movable members to receive and hold the wires side by side a distance from the package and by rotation to intertwist them, and means to hold said wires side by side adjacent the package whereby the formation of the twist is controlled.

14. A tool for joining package wires by intertwisting comprising relatively movable gripping members normally expanded to receive the wires to be joined, means to position the gripping members a determined distance from the package, and means to close said gripping members upon the wires under variable degrees of pressure whereby rotation of the gripping members will cause the wires to be intertwisted and then severed, the time of severing being controlled by the degree of pressure on the wire exerted by the gripping members.

15. A tool for joining package wires by intertwisting comprising relatively movable gripping members normally expanded to receive the wires to be joined and adapted to close upon the wires and by rotation to cause them to be intertwisted and then severed, and means for causing said gripping members to close upon the wires by pressing the nose of the tool against the package.

16. A tool for joining package wires by intertwisting comprising relatively movable gripping members normally expanded to receive the wires to be joined and adapted to close upon the wires and by rotation to intertwist them, and controllable means for causing said gripping members to close upon the wires with variable degrees of pressure.

17. A tool for joining package wires by intertwisting their end portions comprising a rotatable twist-forming device including relatively movable gripping members to grip the wires a distance from the package, and gauging means to position the gripping members relative to the package during a twist-forming operation whereby upon production of a predetermined resistance the tip of the twist will be severed and the twisting operation automatically discontinued.

18. A tool for joining package wires by intertwisting comprising relatively movable wire-gripping means to receive the wire end portions and by rotation to intertwist them, and means to position the gripping means a predetermined distance from the package whereby the production of the twist will tension the wire against the gripping means, said positioning and gripping means cooperating to cause a wire-severing operation upon development of a determined twisting resistance.

19. A twisting tool rotatable on a pair of wire strands as an axis adapted to intertwist said strands and sever them at the end of the twist, said tool having relatively movable members cooperating to grip said strands a distance from the package and hold them in close relationship, and relatively movable members to engage the wire strands and hold them side by side adjacent the package, said wire-gripping members having narrow gripping surfaces of insufficient extent to turn the wires against a predetermined resistance developed by the twist and adapted when such resistance develops to bite into and sever the strands at the terminal of the twist.

20. A tool for joining package wires by forming their ends into an intertwisted projection comprising a rotatable twist-forming device having means to sever the tip of the twist, including relatively movable gripping members determining the tightness of the convolutions of the twist by their pressure on the wires, and means to control said pressure.

21. A tool for joining package wires by forming their ends into an intertwisted projection comprising a rotatable twist-forming device having means to sever the tip of the twist, including relatively movable gripping members determining the time of a severing operation by the degree of pressure exerted on the wires, and means to control said pressure.

22. A tool for joining package wires by forming their ends into an intertwisted projection comprising a rotatable twist-forming device having means to sever the tip of the twist, including relatively movable gripping members determining the tension of the wire about the box by the extent of pressure exerted on the wire ends, and means to control said pressure.

23. A tool for joining package wires by intertwisting their ends, comprising a rotatable twist-forming device having means to sever the wires at the tip of the twist, including relatively movable members adapted to grip the wires with variable degrees of pressure, and means to control said pressure.

24. A tool for joining package wires comprising relatively movable means to grip the wire ends projected in the same direction from the package and, by rotation, to intertwist the same, and means holding the gripping means at a determined distance from the package during the twisting operation whereby the tightening of the twist tensions the wire oppositely from the package and gripping means.

25. A tool for joining package wires by twisting, comprising relatively movable wire-gripping means to produce the twist, and means positioning the wires and holding them from winding one about the other at a distance from said gripping means, whereby the twist forms evenly throughout the distance between the gripping and positioning means and with each turn or convolution of the twist uniformly tensioned.

26. A tool for use in joining wires by intertwisting, comprising relatively movable twisting means to close upon the wires and cooperating means to cause the twist to form gradually and evenly along the length of the wires.

27. A tool for use in joining wires by intertwisting, comprising relatively movable twisting means to embrace the wires, and means determining the formation of the twist; said twisting means being adapted to perform a wire-severing action upon completion of the twist as determined by said last named means.

28. A tool for use in joining package wires by intertwisting, comprising relatively movable gripping members normally expanded to receive the wires, means to cause said gripping members to close upon and grip the wires for a twisting operation; and means to control the gripping of said members on the wires.

29. A tool for use in joining package wires by intertwisting, comprising relatively movable gripping members normally expanded to receive the wires; means to contract said gripping members; and means to control the extent of contraction of said members.

30. A tool for use in joining package wires by intertwisting, comprising relatively movable members normally expanded to receive the wires, means to position said members a distance from the package during the operation of the tool, and means operable by pressure of the tool against the package to contract said members toward the wires until the distance between said members is less than twice the diameter of a wire thus preventing one wire from slipping about the other at the point of engagement by said members.

31. A tool for use in joining package wires by intertwisting, comprising relatively movable members adapted to close upon and incase the wires to be joined, including means to engage the wires adjacent the package body, and gripping members to engage the wires at a fixed distance therefrom whereby, when the tool is rotated, the wires will be intertwisted between said points of engagement.

32. A wire joining tool of the character described, having the relatively movable gripping members 12—12 and means to position them relative to a package during a wire joining operation.

33. A wire joining tool of the character described, having the relatively movable jaws 1 and 2 and the gripping members 12—12 positioned a fixed distance from the extremities of the jaws as and for the purpose described.

34. A wire joining tool of the character described, having the body portion 3, the relatively movable jaws 1 and 2 each carrying a gripping member 12 positioned a fixed distance from the extremity of its jaw, and the toggle 11 for causing the gripping members 12 to close upon and grip the wires to be joined.

In testimony whereof, I have signed my name to this specification.

SERAPHINE F. BAUWENS.